United States Patent [19]

Suemitsu

[11] Patent Number: 5,628,049
[45] Date of Patent: May 6, 1997

[54] MOBILE SATELLITE TERMINAL EQUIPMENT

[75] Inventor: Goro Suemitsu, Tokyo, Japan

[73] Assignee: NEC Corporation, Japan

[21] Appl. No.: 694,443

[22] Filed: Aug. 12, 1996

Related U.S. Application Data

[62] Division of Ser. No. 519,541, Aug. 25, 1995.

[30] Foreign Application Priority Data

Aug. 29, 1994 [JP] Japan .................................... 6-203170
Aug. 29, 1994 [JP] Japan .................................... 6-203181

[51] Int. Cl.⁶ ............................................. H04B 7/15
[52] U.S. Cl. ................... 455/11.1; 455/33.1; 455/54.1
[58] Field of Search ......................... 455/11.1, 12.1, 455/15, 20, 21, 22, 33.1, 54.1, 93, 142, 90, 128, 129, 348, 349, 351, 89; 379/58, 59

[56] References Cited

U.S. PATENT DOCUMENTS

| 5,490,284 | 2/1996 | Itoh et al. ........................... 455/11.1 |
| 5,535,430 | 7/1996 | Aoki et al. .............................. 455/89 |
| 5,535,432 | 7/1996 | Dent ......................................... 455/89 |

*Primary Examiner*—Reinhard J. Eisenzopf
*Assistant Examiner*—Nguyen Vo
*Attorney, Agent, or Firm*—Laff, Whitesel, Conte & Saret, Ltd.

[57] ABSTRACT

A satellite system antenna/high frequency unit of a mobile terminal of the present invention is constructed with a satellite system antenna for a mobile satellite communication system and a satellite system high frequency circuit and a first interface is provided externally of a casing of the unit. A ground system antenna/high frequency unit is constructed with a ground system antenna for a mobile ground communication system and a ground system high frequency circuit and a second interface is provided externally of a casing of the unit. A radio control unit includes a circuit portion within a casing thereof for demodulating a receiving signal to an input intermediate frequency signal and modulating a transmission signal and converting it into an intermediate frequency signal. The radio control unit further includes a radio control interface and a set of switches provided externally of the casing and, in use, only one of the first and second interfaces is connected to the radio control interface. The present mobile equipment can be used in an area which is not covered by a satellite by using a relay device for converting the mobile satellite system into the mobile ground system.

2 Claims, 9 Drawing Sheets

5,628,049

MOBILE SATELLITE TERMINAL EQUIPMENT

This application is a division of prior application Ser. No. 08/519,541, filed Aug. 25, 1995.

BACKGROUND OF THE INVENTION

The present invention relates to a mobile satellite communication terminal equipment and, particularly, to a mobile satellite communication terminal equipment which can also be used as a ground mobile terminal performing communication through only ground facilities.

It is well known that, as a communication system to be used in a mobile telephone or portable telephone, there are two kinds of system, a ground mobile communication system (cellular system) which utilizes only ground facilities and a mobile satellite communication system which utilizes a satellite.

In the ground mobile communication system such as mobile telephone system which has been popularized recently, a mobile telephone which is the mobile communication terminal communicates, through radio wave, together with a nearest radio base station which is connected to a fixed telephone network through an upper exchange station, so that the mobile telephone can communicate with a subscriber of the network.

On the other hand, although the mobile satellite communication system is inoperable in an area such as underground area, interior of a building or area under an overhead construction which is out of line-of-sight of a satellite, it is operable in any out-of-way area such as solitary island or mountain area in which the ground communication system can not provide services economically, so long as the out-of-way area is on a direct line-of-sight of the satellite. Therefore, the mobile satellite communication system having a wide service area is expected as a complementary system for the ground mobile communication system.

Particularly, in a mobile satellite communication system utilizing a Low Earth Orbit (LEO) satellite in which a distance of a mobile ground terminal measured from the LEO satellite is short and a beam irradiation range is narrow compared with a stationary satellite, a communication is possible with lower receiving sensitivity and smaller transmission power of the terminal. Therefore, it is possible to reduce a size and weight of the mobile terminal and power consumption thereof. Thus, the mobile terminal of the satellite system can be realized with the size and cost compatible with those of the mobile terminal of the ground communication system.

However, the mobile ground communication system and the mobile satellite communication system had been developed separately from each other and an antenna, a high frequency portion and a radio control portion of the mobile terminal of each system are assembled as a discrete integral unit.

Therefore, when a user moves from an area in which either one of the mobile ground communication and the mobile satellite communication is possible to another area in which only the other communication is possible, he must bring the mobile terminals of the both systems with him. This is troublesome for the user.

In order to solve this problem, Japanese Patent Application Laid-open No. Hl-248715 (1989) proposes a single mobile terminal which can be connected to either of the ground system and the satellite system. That is, as shown in FIG. 1, the proposed mobile terminal comprises a satellite system antenna 101, a ground system antenna 102, a satellite system high frequency portion 103 connected to the satellite system antenna 101, a ground system high frequency portion 104 connected to the ground system antenna 102, a receiving IF switch circuit 105 for selecting an output intermediate frequency signal of either one of the high frequency portions 103 and 104, a transmitting IF switch circuit 106 for selectively outputting a transmitting intermediate frequency signal to either one of the high frequency portions 103 and 104, a demodulator 107 for demodulating the intermediate frequency signal from the receiving IF switch circuit, a modulator 108 for modulating a transmitting signal, a baseband processor 109 for processing signals according to a protocol of a selected one of the satellite system and the ground system, a telephone set 110 and a portable computer 111.

According this mobile terminal, the baseband processor, the telephone set and the portable computer which are related to a signal processing subsequent to the IF signal are used commonly for the satellite system and the ground system.

However, since the antennas and the high frequency portions of the respective systems are incorporated, both the transmitting and receiving systems must be transported even when only one of the ground and satellite systems is used. Further, since both of the receiving IF switch circuit and the transmitting IF switch circuit are necessary, the terminal can not be enough compact and enough light-weight, causing the portability thereof to be low and the reduction of cost to be impossible.

Further, the mobile satellite communication system can not be used in an area such as underground area, interior of a building or area under an overhead construction which is out of line-of-sight of a satellite and, since a communication from an office in a country or area in which the ground communication system can not work effectively is impossible unless the satellite is on a line-of-sight of the terminal, the terminal must be moved close to a window of the office.

SUMMARY OF THE INVENTION

The present invention was made in view of the problems inherent to the conventional mobile satellite terminal and has a first object to provide a compacg and light weight mobile satellite terminal which can be used as a ground mobile communication terminal as well as a satellite mobile communication terminal.

A second object of the present invention is to provide a mobile satellite communication relay device which makes a mobile ground communication and a mobile satellite communication possible when the mobile satellite terminal equipment is in out of line-of-sight of a satellite.

In order to achieve the first object of the present invention, a mobile satellite terminal according to the present invention comprises a satellite system antenna/high frequency unit, a ground system antenna/high frequency unit and a radio control unit which is selectively connected to one of the satellite system antenna/high frequency unit and the ground system antenna/high frequency unit through a radio control interface.

The satellite system antenna/high frequency unit comprises a satellite system antenna of a mobile satellite communication system and a satellite system high frequency portion connected to the satellite system antenna. The satellite system high frequency portion is adapted to convert a receiving signal into an intermediate frequency signal and output it to a first interface and to convert the intermediate frequency signal input through the first interface into a satellite system high frequency signal. The first interface is provided externally of a casing of the satellite system antenna/high frequency unit.

The ground system antenna/high frequency unit comprises a ground system antenna of a mobile ground communication system and a ground system high frequency portion connected to the ground system antenna. The ground system high frequency portion is adapted to convert a receiving signal into an intermediate frequency signal and output it to a second interface and to convert the intermediate frequency signal input through the second interface into a ground system high frequency signal. The second interface is provided externally of a casing of the ground system antenna/high frequency unit.

Further, the radio control unit includes a circuit portion provided internally of a casing thereof for demodulating a receiving input intermediate frequency signal input from one of the ground and satellite antenna/high frequency units through a radio control interface according to a demodulation system assigned to the one unit and outputs a transmitting signal to the radio control interface after modulating it according to a modulation system assigned to the one unit and then converting it into an intermediate frequency. The radio control interface is provided externally of the casing thereof. The radio control unit further comprises at least a key board and a telephone set externally of the casing thereof. One of the first and second interfaces is connected to the radio control interface when corresponding one of the satellite and ground antenna/high frequency units is used.

Further, in the present invention, the satellite system antenna/high frequency unit is adapted to generate a control signal for switching the modulation and demodulation systems of the circuit portion of the radio control unit to those suitable for the mobile satellite communication system when its interface is connected to the radio control interface thereof and the ground system antenna/high frequency unit is adapted to generate a control signal for switching the modulation and demodulation systems of the circuit portion of the radio control unit to those suitable for the mobile ground communication system when its interface is connected to the radio control interface of the radio control unit.

As mentioned above, in the present invention, in either the ground system or the satellite system, the radio control unit demodulates a receiving intermediate frequency signal having frequency which is common for the ground system and the satellite system and converts the transmitting signal into an intermediate frequency. Therefore, it is possible to use the same radio control unit regardless of whether the mobile communication system is the ground system or the satellite system and it is possible to communicate together with the other side through a desired mobile communication system by selectively connecting one of the first and second interfaces to the radio control interface of the radio control unit according to the mobile communication system selected.

Further, in the present invention, the satellite system antenna/high frequency unit or the ground system antenna/high frequency unit generates the control signal when it is connected to the radio control interface of the radio control unit to switch the modulation and demodulation systems of the circuit portion of the radio control unit to those suitable for the mobile communication system selected. Therefore, it is possible to automatically switch the modulation and demodulation systems of the circuit portion of the radio control unit to those suitable for the selected one of the ground antenna/high frequency unit and the satellite antenna/high frequency unit when it is connected to the radio control unit.

In order to achieve the second object of the present invention, a relay device for the mobile satellite communication according to the present invention comprises a first antenna/high frequency unit including an antenna of a first mobile communication system and a high frequency portion connected to the antenna for converting a receiving signal into an intermediate frequency signal and converting an intermediate frequency signal input through a first interface into a high frequency signal, the first interface being provided externally of a casing of the first antenna/high frequency unit and a second antenna/high frequency unit including an antenna of a second mobile communication system and a high frequency portion connected to the antenna for converting a receiving signal into an intermediate frequency signal and converting an intermediate frequency signal input through a second interface into a high frequency signal, the second interface being provided externally of a casing of the second antenna/high frequency unit. The first interface is connected to a first radio control interface and the second interface is connected to a second radio control interface and a bi-directional signal transmission is performed between the first and second radio control interfaces. Thus, a function of a relay device is realized.

Further, the first antenna/high frequency unit includes a satellite system antenna for transmitting/receiving radio signal with respect to a satellite and a high frequency circuit for converting a receiving signal into an intermediate frequency signal and supplying it to the first radio control interface and for converting a transmitting signal into a high frequency signal for the mobile satellite communication system. The second antenna/high frequency unit includes a ground system antenna for transmitting/receiving radio signal with respect to the mobile satellite communication terminal and a high frequency circuit for converting a receiving signal into an intermediate frequency signal and supplying it to the second radio control interface and for converting a transmitting signal into a high frequency signal for the mobile ground communication system.

As mentioned above, in the mobile satellite communication terminal of the present invention, the first interface of the first antenna/high frequency unit and the second interface of the second antenna/high frequency unit are connected to the first and second radio control interfaces of the relay device, respectively, so that the bi-directional signal transmission is performed between the first and second radio control interfaces. Therefore, a communication is possible between a mobile communication system capable of transmitting/receiving a signal by means of the first antenna/high frequency unit and another mobile communication system capable of transmitting/receiving a signal by means of the second antenna/high frequency unit.

Particularly, when the first antenna/high frequency unit is the satellite system antenna/high frequency unit and the second antenna/high frequency unit is the ground system antenna/high frequency unit for radio communication with respect to the mobile satellite communication terminal, it is possible to realize a mobile communication with respect to the mobile satellite communication terminal through the satellite.

DESCRIPTION OF THE PREFERRED EMBODIMENTS OF THE INVENTION

Figure 1:
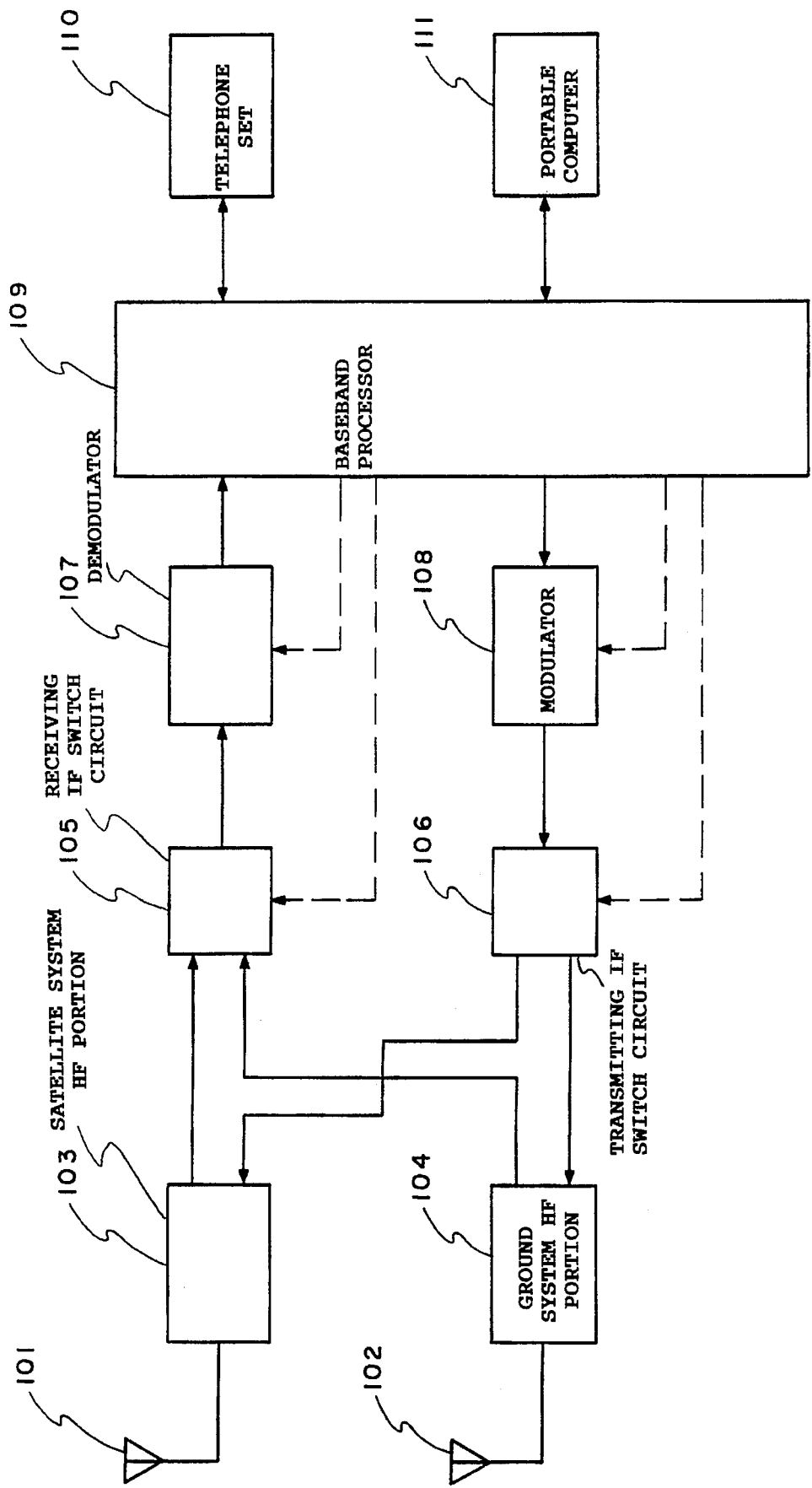
FIG. 1 is a block circuit diagram showing a conventional mobile communication terminal.
Figure 2:
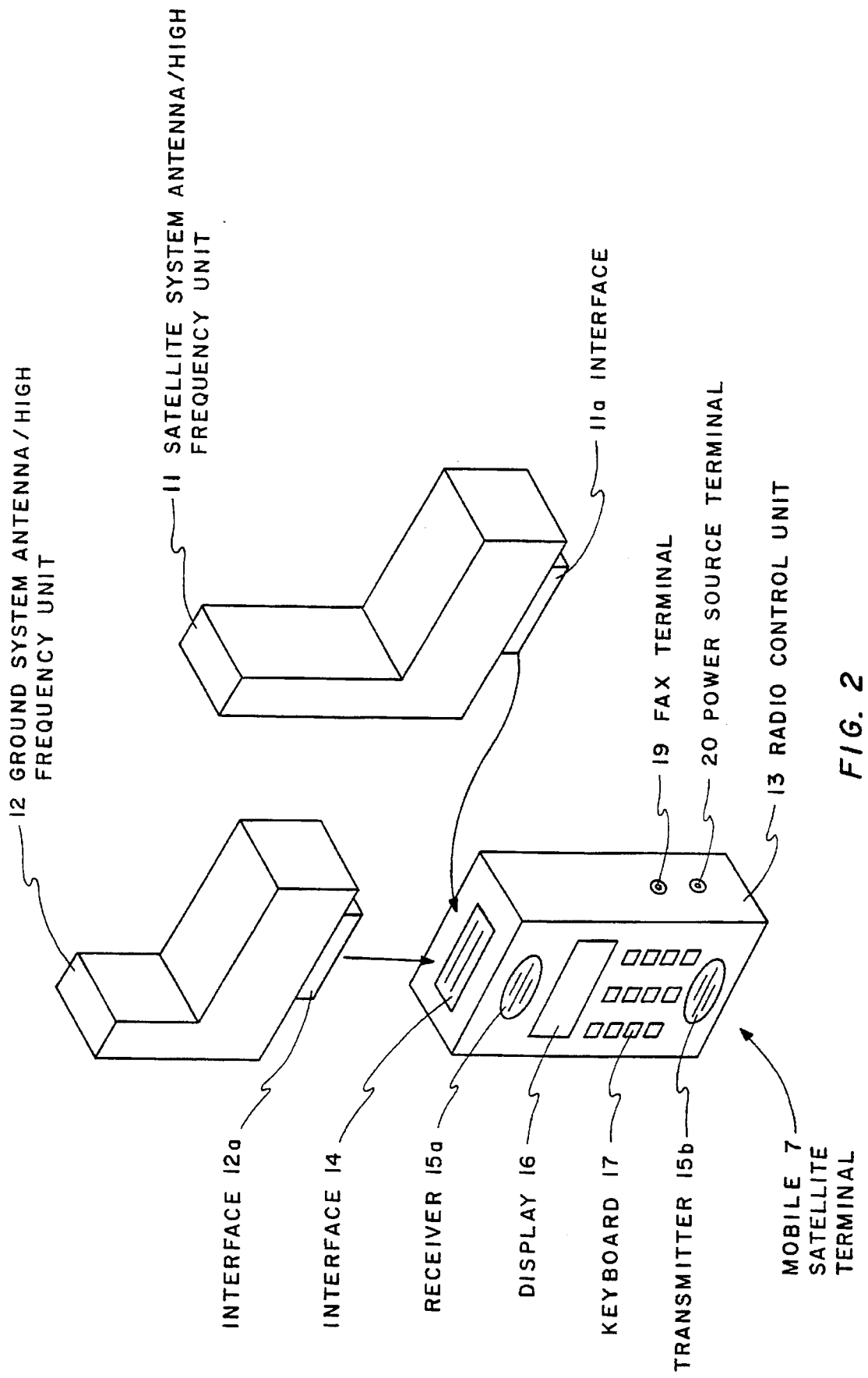
FIG. 2 is a perspective view of a mobile communication terminal according to the present invention.

An embodiment of a mobile satellite communication terminal according to the present invention will be described with reference to FIG. 2 which shows a construction of the mobile satellite communication terminal in perspective view. As shown in FIG. 2, the mobile satellite terminal 7 of the present invention is constructed with a satellite system antenna/high frequency unit 11, a ground system antenna/high frequency unit 12 and a radio control unit 13.

The satellite system antenna/high frequency unit 11 is constructed with a satellite system antenna for a mobile satellite communication system, a satellite system high frequency portion connected to the satellite system antenna and an interface 11a externally provided on the satellite system antenna/high frequency unit 11 as a connector including an interface circuit. The ground system antenna/ high frequency unit 12 is constructed with a ground system antenna for a mobile ground communication system, a ground system high frequency portion connected to the ground system antenna and an interface 12a externally provided on the ground system antenna/high frequency unit 12 as a connector.

The radio control unit 13 includes a circuit portion to be described later, which demodulates an intermediate frequency signal (IF signal) of a receiving signal according to a demodulation system assigned to selected one of the satellite communication system and the ground communication system and modulates a transmitting audio or data signal according to a modulation system assigned to the selected communication system and converts it into an IF signal. Further, the radio control unit 13 is provided, in an upper portion of a casing thereof, with an interface 14 to which either of the ground system antenna/high frequency unit 12 or the satellite system antenna/high frequency unit 13 is selectively connected. On a front panel of the casing of the radio control unit 13, a receiver 15a, a transmitter 15b, a display 16 and a key board (ten key) 17 are provided.

Figure 3:
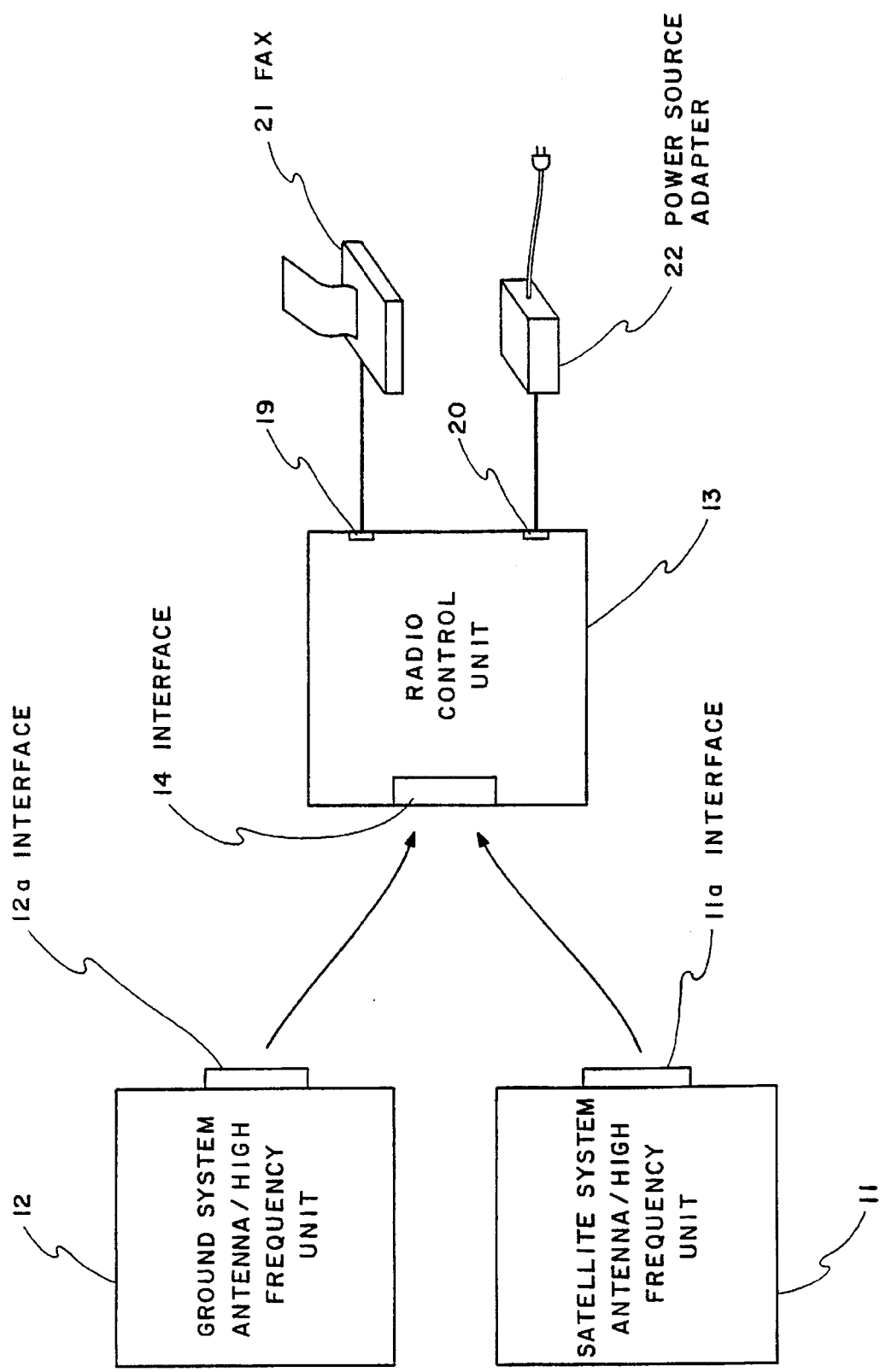
FIG. 3 is a block circuit diagram of an embodiment of the mobile communication terminal of the present invention.

FIG. 3 is a schematic block diagram of the embodiment of the present invention shown in FIG. 2. In FIG. 3, the interface 11a of the satellite system antenna/high frequency unit 11 is provided on, for example, a lower portion of the casing thereof as in the case of the interface 12a of the ground system antenna/high frequency unit 12. Each of the interfaces 11a and 12a has suitable size and configuration for connection to the interface 14 of the radio control unit 13.

Further, in order to transmit other information than audio signal, the radio control unit 13 is equipped with a facsimile interface 19 connectable to a facsimile device 21 and a power supply interface 20 connectable to an external A.C. power source such that it can operate with the external power source. The power source adapter 22 functions to convert an A.C. power from the external power source into a D.C. power. When the radio control unit 13 is to be operated with a D.C. power directly, the latter can be supplied from, for example, a car battery.

Figure 4:
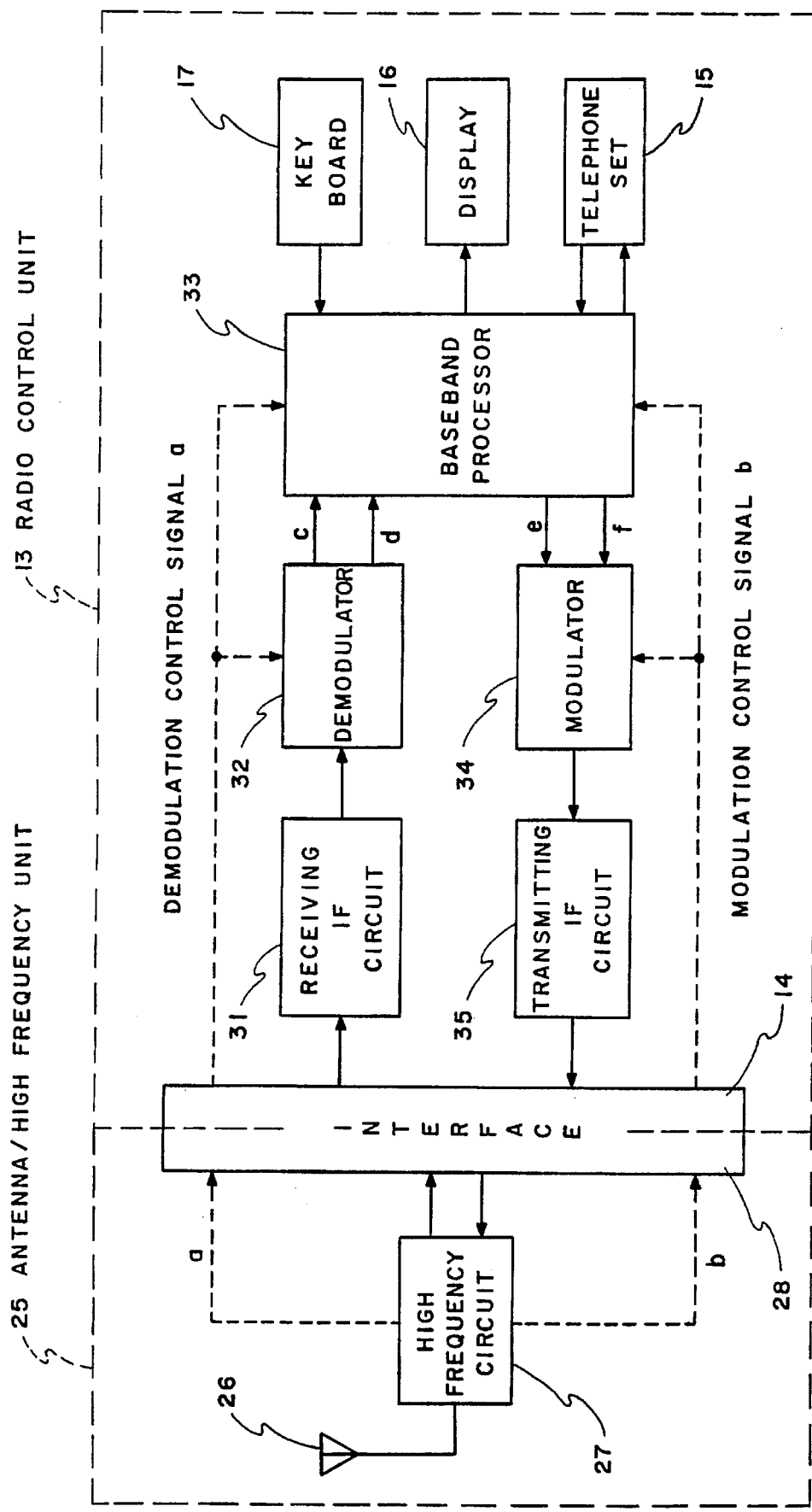
FIG. 4 is a block circuit diagram showing the present mobile communication terminal in more detail.

FIG. 4 is a detailed block circuit diagram of an embodiment of the radio control unit 13 and an antenna/high frequency unit 25 which may be either the satellite system antenna/high frequency unit 11 or the ground system antenna/high frequency unit 12 and connected to the radio control unit 13. In FIG. 4, same components as those shown in FIGS. 2 and 3 are depicted by the same reference numerals, respectively.

As shown in FIG. 4, the radio control unit 13 is constructed with an interface 14 which can connect either the ground system antenna/high frequency unit 12 or the satellite system antenna/high frequency unit 11, a telephone set 15 including the receiver 15a and the transmitter 15b, a display 16, a key board 17, a receiving IF circuit 31, a demodulator 32, a baseband processor 33, a modulator 34 and a transmitting IF circuit 35. The facsimile interface 19 and the power source interface 20 are omitted for simplicity of illustration.

The antenna/high frequency unit 25 is constructed with a satellite or ground system antenna 26, a high frequency circuit 27 and an interface 28 which is the interface 11a when the antenna/high frequency unit 25 is the satellite system antenna/high frequency unit 11 or the interface 12a when the antenna/high frequency unit 25 is the ground system antenna/high frequency unit 12. The satellite system antenna/high frequency unit 11 differs from the ground system antenna/high frequency unit 12 in that a higher power amplifier in the transmitting portion of the satellite system antenna/high frequency unit 11 than a power amplifier of the transmitting portion of the ground system antenna/ high frequency unit 12 is required and a lower noise amplifier of the receiving portion of the satellite system antenna/ high frequency unit 11 than a amplifier of the receiving portion of the ground system antenna/high frequency unit 12 is required. The operating frequency band of the satellite system and that of the ground system are generally in L band and, since the frequency difference therebetween is small, a common use of the single radio control unit 13 is possible. Therefore, in order to realize a combined use of the satellite system and the ground system economically, the satellite system antenna/high frequency unit and the ground system antenna/high frequency unit are selectively used.

Now, an operation of this embodiment will be described with reference to FIGS. 2 to 4. When the mobile communication system which is to be selected by a user is the satellite system, the interface 11a of the satellite system antenna/high frequency unit 11 is connected to the interface 14 of the radio control unit 13 and, when the mobile communication system which is to be selected by the user is the ground system, the interface 12a of the ground system antenna/high frequency unit 12 is connected to the interface 14.

Figure 5:
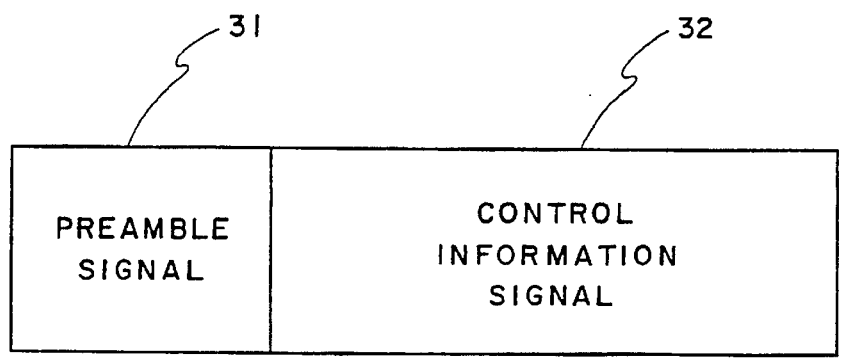
FIG. 5 shows a data format of a control signal used in the present mobile communication terminal.

By connecting the interface 28 (11a or 12a) of the antenna/high frequency unit 25 (the satellite system antenna/ high frequency unit 11 or the ground system antenna/high frequency unit 12) to the interface 14 of the radio control unit 13, the satellite system antenna/high frequency unit 11 or the ground system antenna/high frequency unit 12 is fixedly connected to the radio control unit 13 and, as shown in FIG. 4, a demodulation control signal a and a modulation control signal b of the satellite or ground system from the high frequency circuit 27 are input to the radio control unit 13 through the interfaces 28 and 14, respectively. That is, the demodulation control signal and the modulation control signal are contained in a control information data portion 32 of a control signal which takes in the form of a serial data composed of a preamble data portion 31 and the control information data portion 32 such as shown in FIG. 5 and is supplied from the high frequency circuit 27 to the radio control unit 13.

The demodulation control signal a is supplied to the demodulator 32 and the baseband processor 33 to switch the demodulator 21 such that the latter performs a demodulation according to a demodulation system assigned to the antenna/high frequency unit 25 connected to the radio control unit 13 and to switch the baseband processor 33 such that the latter performs the receiving signal processing according to a predetermined system assigned to the antenna/high frequency unit 25. The demodulator 32 can select one of various demodulation systems according to the demodulation control signal a such that it can demodulate an input signal according to a modulation system used in the satellite communication or the ground system cellular, etc. For example, one of MSK, BPSK, QPSK and 8 Φ-PSK demodulation systems, etc., can be controlled by using a control bit of the demodulation control signal a.

At the same time, the modulation control signal b is supplied to the baseband processor 33 and the modulator 34 to switch the baseband processor 33 such that the latter performs a transmitting processing in the baseband processor 33 according to a predetermined system assigned to the antenna/high frequency unit 25 connected to the radio control unit 13 and to switch the modulator 34 such that the latter performs a predetermined modulation assigned to the antenna/high frequency unit 25.

Thus, by merely connecting the interface 28 (11a or 12a) of the antenna/high frequency unit 25 (satellite system antenna/high frequency unit 11 or the ground system antenna/high frequency unit 12) to the interface 14 of the radio control unit 13, the antenna/high frequency unit 25 to which the demodulator 32, the baseband processor 33 and the modulator 34 of the radio control unit 13 are connected is automatically switched to perform the modulation and demodulation according to the satellite system when the unit 25 is the satellite system antenna/high frequency unit 11 and the ground system when the unit 25 is the ground system antenna/high frequency unit 12. In addition to the difference of modulation and demodulation systems between the satellite system and the ground system, when, for example, a frequency control system and/or an error correction system of the satellite system are different from those of the ground system, it is of course possible to switch between them according to the control information data 32.

Therefore, the receiving IF signal obtained by converting the receiving signal received by the antenna 26 of the antenna/high frequency unit 25 into a predetermined intermediate frequency by the high frequency circuit 27 is input through the interfaces 28 and 14 to the receiving IF circuit 31 and then to the demodulator 32 in which it is demodulated normally. The high frequency circuit 27 has a function of converting a signal in a microwave band or sub-microwave band which is used for the mobile communication of the satellite or ground system into an intermediate frequency.

In order to simplify the construction of the radio control unit 13, it is preferable to select a frequency relation of the high frequency circuit 27 such that this intermediate frequency becomes common for the satellite system antenna/high frequency unit 11 and the ground antenna/high frequency unit 12.

Further, in order to transmit the intermediate frequency in the interface 14 between the antenna/high frequency unit 25 and the radio control unit 13, to prevent problems of a signal leak due to high frequency signal transmission and a degradation of transmission characteristics from occurring and to simplify a demounting of the interface 14, it is preferable that an intermediate frequency band is as low as possible.

In the present invention, in order to construct the interface 14 without using a high frequency coaxial connector, the intermediate frequencies of the satellite system antenna/high frequency unit 11 and the ground antenna/high frequency unit 12 are commonly in about 4 MHz band. In order to obtain this intermediate frequency, local oscillation frequencies of the high frequency circuits of the units 11 and 12 are selected as suitable values.

A demodulation signal c of the baseband derived by the demodulator 32 is supplied to the baseband processor 33 together with a demodulation clock d, processed thereby according to a related protocol and converted into an audio signal or a video data. The receiving audio signal derived from the baseband processor 33 is supplied to the telephone set 15 and the video signal is supplied to the display 16 and displayed thereby.

On the other hand, during a signal transmission, a transmission data input from the key board 17 or an audio signal input from the telephone set 15 is processed by the baseband processor 33 according to a protocol suitable to the antenna/high frequency unit 25 and a resultant transmission signal e is supplied to the modulator 34 together with a transmission clock f and modulated according to the switched modulation system.

A modulated wave output from the modulator 34 is converted by the transmission IF circuit 35 into the IF signal having the predetermined intermediate frequency and supplied to the high frequency circuit 27 through the interfaces 14 and 28. Then, it is converted by the high frequency circuit 27 into a high frequency signal in the transmission frequency band and transmitted from the antenna 26.

As mentioned above, according to this embodiment, the mobile satellite communication equipment is realized by connecting the interface 11a of the satellite system antenna/high frequency unit 11 to the interface 14 of the radio control unit 13 and the mobile ground communication equipment is realized by connecting the interface 12a of the ground system antenna/high frequency unit 12 to the interface 14 of the radio control unit 13.

Therefore, by selecting one of the satellite system antenna/high frequency unit 11 and the ground system antenna/high frequency unit 12 to be connected to the radio control unit 13 depending upon whether the mobile communication system to be used is the satellite system or the ground system, it is possible to always perform a mobile communication.

Further, since, in this embodiment, it is possible to commonly use the radio control unit 13 for the mobile communication of the satellite and ground systems while changing only the antenna/high frequency unit, this embodiment is advantageous in size, weight, portability and cost compared with the mobile communication equipment disclosed in Japanese Patent Application Laid-open No. Hl-248715.

Figure 6:
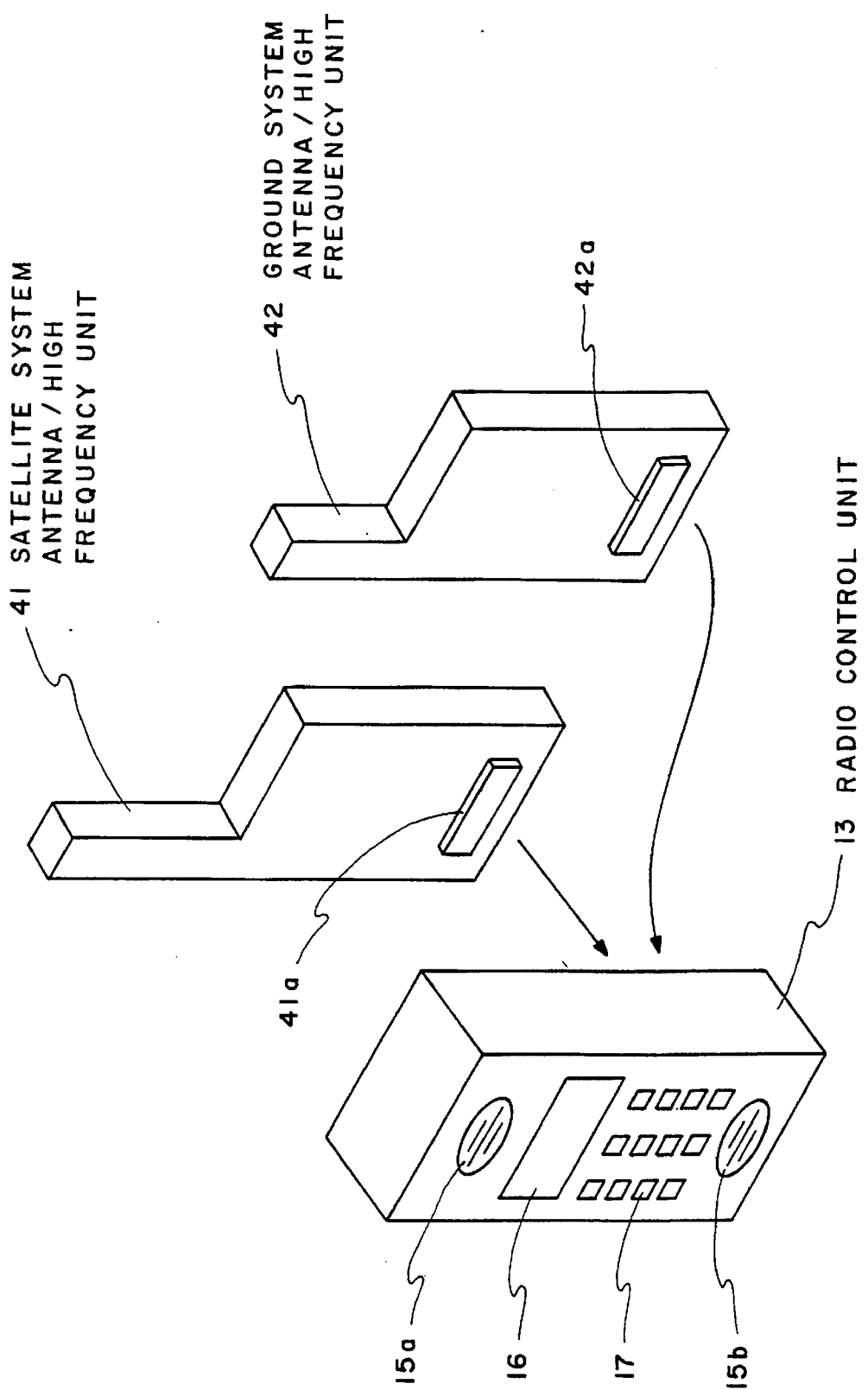
FIG. 6 is a block circuit diagram of another embodiment of the mobile communication terminal according to the present invention.

Another embodiment of the present invention will now be described. FIG. 6 shows a construction of the embodiment schematically. In FIG. 6, same constructive components as those shown in FIG. 2 are depicted by the same reference numerals, respectively, without detailed description thereof. This embodiment is constructed with a satellite system antenna/high frequency unit 41, a ground system antenna/high frequency unit 42 and a radio control unit 43.

The satellite system antenna/high frequency unit 41 is constructed with a satellite system antenna for a mobile satellite communication system, a satellite system high frequency portion connected to the satellite system antenna and an interface 41a provided on a front panel of a casing of the unit.

The ground system antenna/high frequency unit 42 is constructed with a ground system antenna for a mobile ground communication system, a ground system high frequency portion connected to the ground the ground system antenna and an interface 42a provided on a front panel of the unit 42. Each of the antenna/high frequency units 41 and 42 has the same construction as that of the antenna/high frequency unit 25 shown in FIG. 4.

On the other hand, the radio control unit 43 has the same circuit construction as that of the radio control unit 13 shown in FIGS. 2 to 4. Further, the receiver 15a is provided on a front panel of a casing thereof and an interface is provided on a rear surface of the casing.

That is, this embodiment differs from the embodiment shown in FIGS. 2 to 4 in only that the interface 41a of the satellite system antenna/high frequency unit 41 or the interface 41a of the ground system antenna/high frequency unit 42 is connected to the interface provided on the rear surface of the casing of the radio control unit 43. Therefore, this embodiment can provide the same effect as that obtained in the preceding embodiment.

Figure 7:
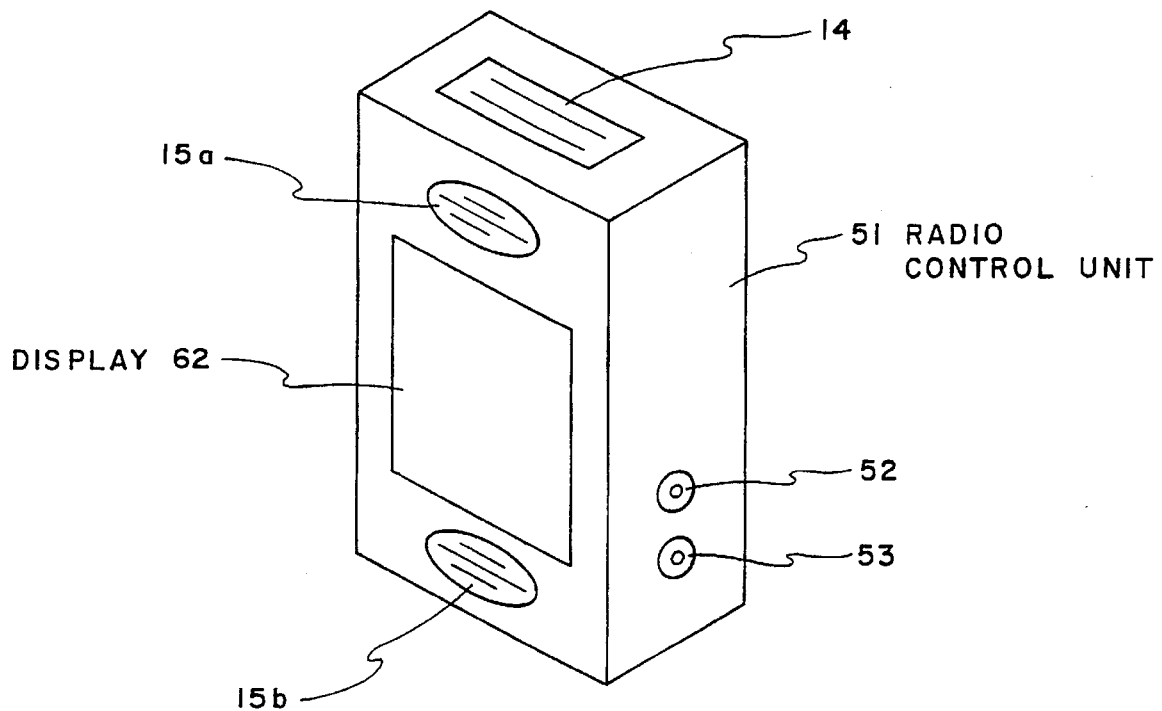
FIG. 7 shows another embodiment of the radio control unit of the mobile communication terminal of the present invention.

Another embodiment of the radio control unit will be described. A radio control unit 51 shown in FIG. 7 includes a display portion 62 which functions as the display 16 and the key board 17 provided on the front panel of the casing of the embodiment shown FIG. 6. That is, the display portion 62 is of a touch-panel type so that the pressure sensitive key input as well as the display is possible.

The present invention is not limited to the described constructions and many modifications thereof are possible within the scope of the present invention. For example, in order to accommodate various transmission/receiving frequencies, the satellite system antenna/high frequency unit 11 or 41 may be constructed such that it can be used in L band (1.5 GHz to 1.6 GHz) for the INMARSAT satellite or in S band (2.5 GHz to 2.6 GHz).

Since, for the ground system, the usual telephone frequency band of 800 MHz and various frequency bands used in MCA radio system, private radio system and room radio system are used, the antenna/high frequency unit 12 or 42 may be constructed so as to deal with each of these frequency bands.

Although the radio control units 13, 43, 51 and 61 are provided with the display 16 or the display portion 62, they may be omitted if necessary.

Figure 8:
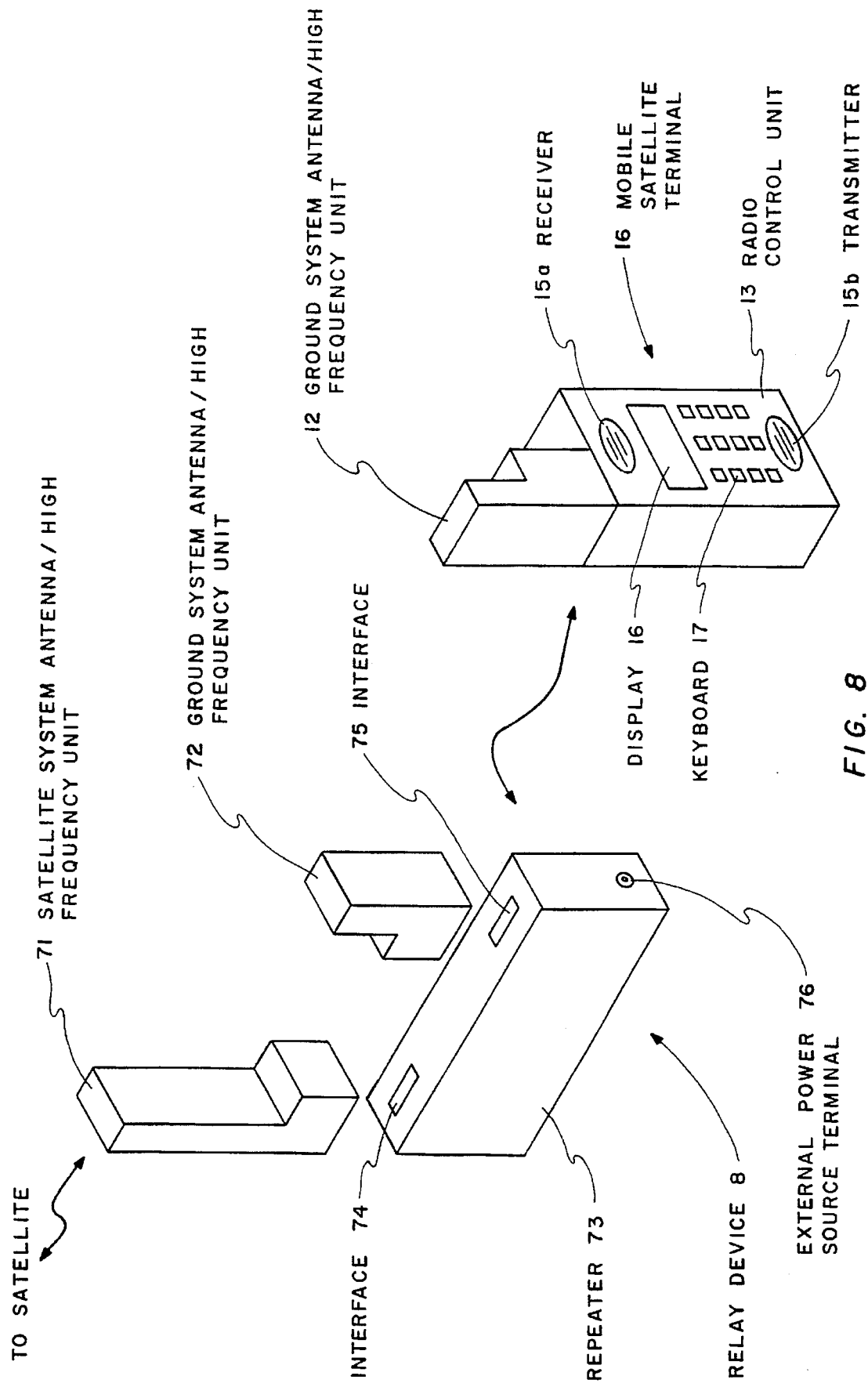
FIG. 8 is a perspective view of a relay device according to the present invention.

An embodiment of a relay device for use in the mobile satellite communication according to the present invention will be described. FIG. 8 shows the embodiment of the relay device 8 of the present invention. As shown in FIG. 8, this embodiment is constructed with a satellite system antenna/high frequency unit 71, a ground system antenna/high frequency unit 72 and a repeater 73. The satellite system antenna/high frequency unit 71, the ground system antenna/high frequency unit 72 and the repeater 73 includes a minimum necessary number of components as to be described later, respectively, and so each of them is compact, light weight and highly portable.

Interfaces of the satellite system antenna/high frequency unit 71 and the ground system antenna/high frequency unit 72 have size and configuration suitable to be coupled with interfaces 74 and 75 of the repeater 73, respectively, and, when coupled, the satellite system antenna/high frequency unit 71 and the ground system antenna/high frequency unit 72 are fixedly held by the repeater 73 and internal circuits of these units are automatically connected to an internal circuit of the repeater 73.

The repeater 73 is provided with an external power source terminal (power source interface) 76 through which it is connected to a power source adapter through which the repeater 73 may be fed from, for example, a car battery.

According to this embodiment, a user usually brings only the repeater 73 with him and, when necessary, the interfaces of the satellite system antenna/high frequency unit 71 and the ground system antenna/high frequency unit 72 are connected to the interfaces 74 and 75 of the repeater 73 and the combination of the units 71 and 72 and the repeater 73 is set in a position which is on a line of sight of a satellite.

Figure 9:
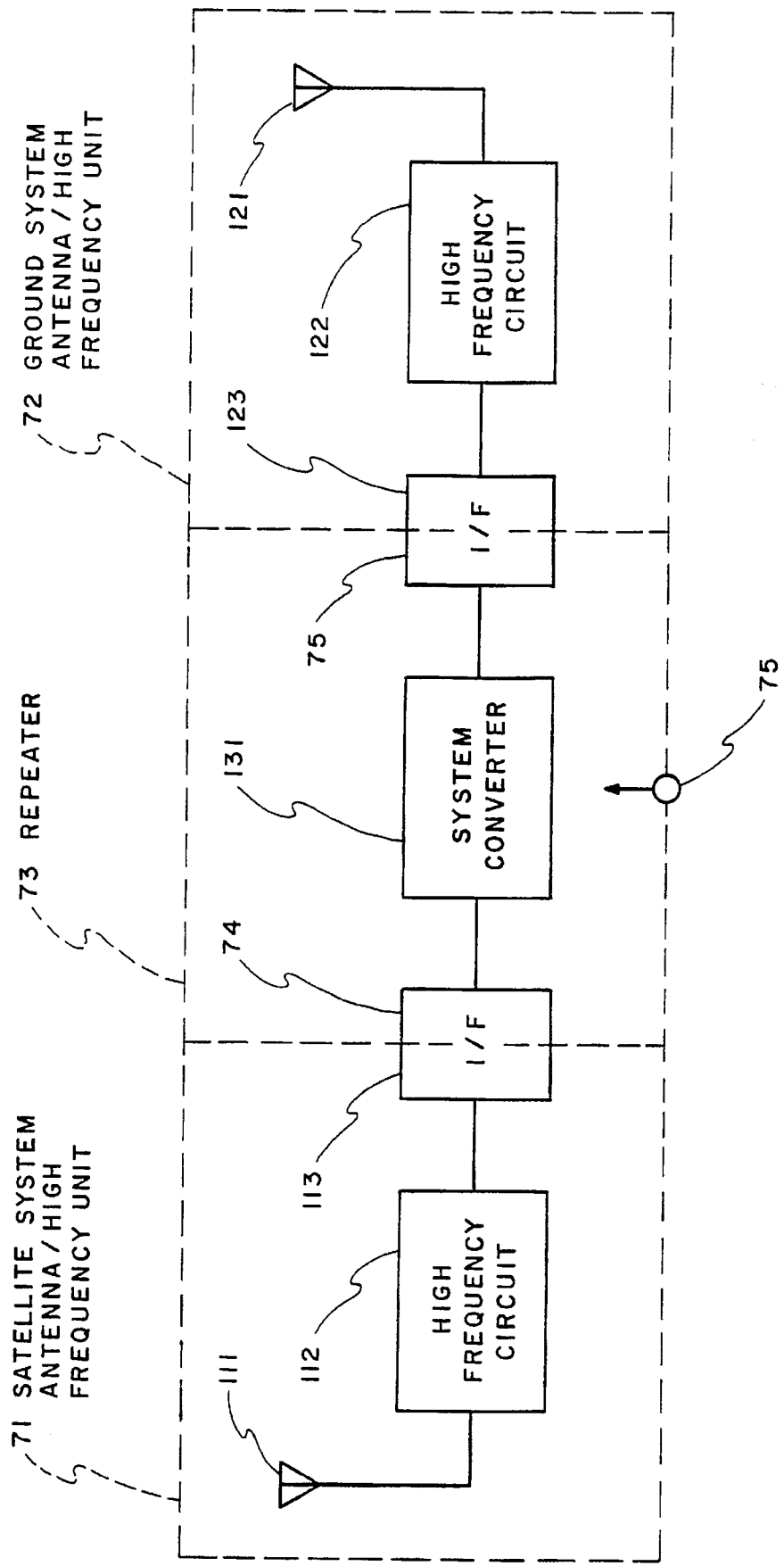
FIG. 9 is a block circuit diagram of the relay device of the present invention.

FIG. 9 is a block circuit diagram of an embodiment of a portable relay device according to the present invention. In FIG. 9, same constructive components as those shown in FIG. 2 are depicted by the same reference numerals, respectively. The satellite system antenna/high frequency unit 71 is constructed with a satellite system antenna 111, a satellite system high frequency circuit 112 and an interface (I/F) 113 which is a connector including an interface circuit. The I/F 113 is provided externally of a casing of the unit 71.

The ground system antenna/high frequency unit 72 is constructed with a ground system antenna 121, a ground system high frequency circuit 122 and an interface (I/F) 123 provided externally of a casing of the unit 72. The repeater 73 is constructed with a first radio control interface 74, a second radio control interface 75, an external power source terminal 76 and a system converter 131. The first and second radio control interfaces 74 and 75 and the external power source terminal 76 are provided externally of a casing of the repeater 73.

Figure 10:
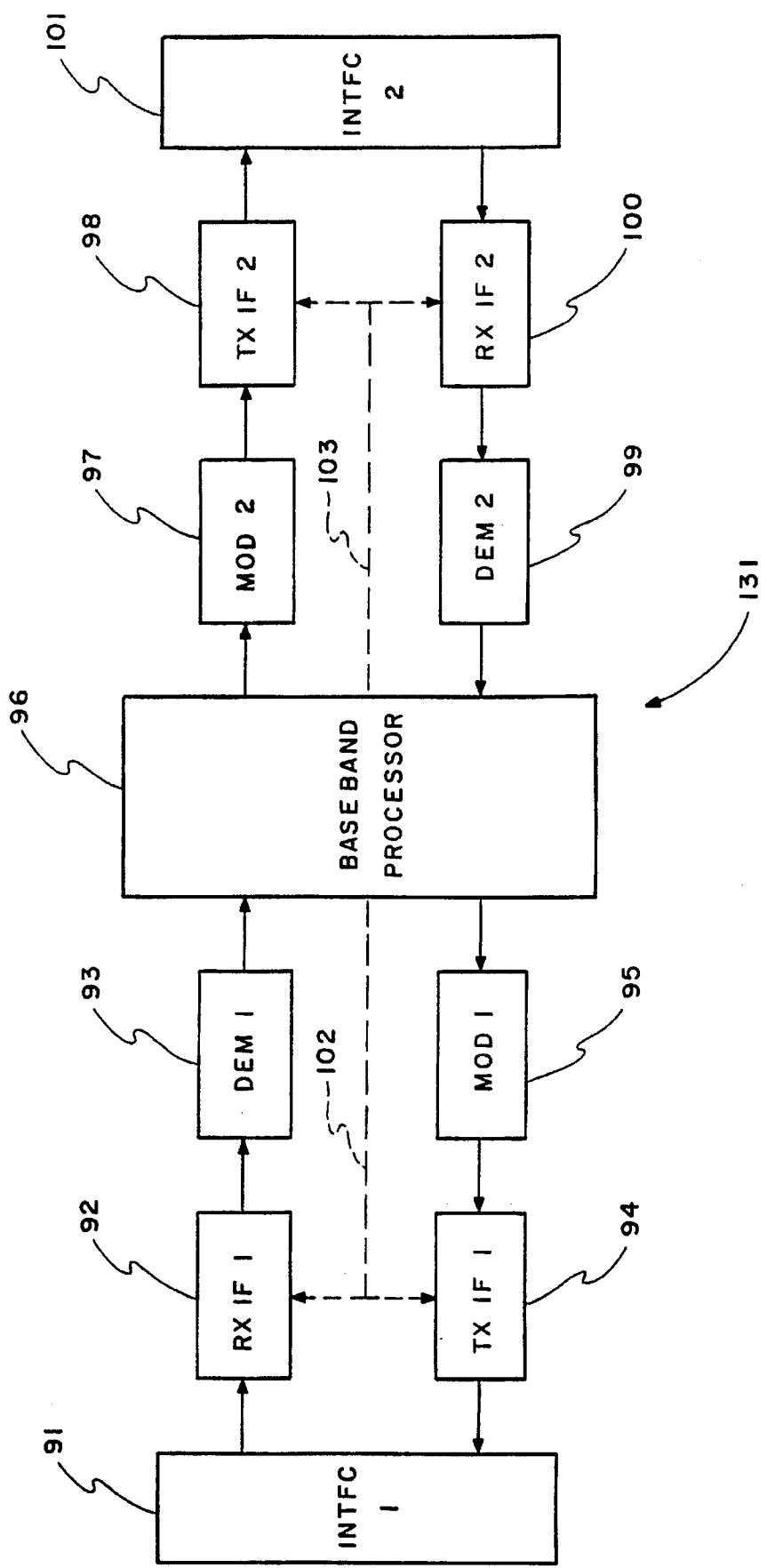
FIG. 10 is a block circuit diagram of a system converter portion of the relay device of the present invention.

FIG. 10 is a block diagram showing the system converter 131. In FIG. 10, an IF signal for a mobile satellite system input from an interface 91 (INTFC 1) is passed through a receiving IF circuit 92 (RX IF 1) and demodulated by a demodulator 93 (DEM 1) to a baseband signal. The baseband signal is input to a baseband processor 96, converted into data necessary for the mobile ground system and input to a modulator 97 (MOD 2). An output of the MOD 2 is converted by a transmission IF circuit 98 (TX IF 2) into an IF signal for the mobile ground system and the IF signal is supplied to an interface 101 (INTFC 2).

On the other hand, a signal conversion from the mobile ground system to the mobile satellite system is performed similarly to the above-mentioned conversion. That is, the IF signal output from the INTFC 2 is input to a receiving IF circuit 100 (RX IF 2) and then demodulated by a demodulator 97 (DEM 2).

The demodulation signal is converted into data for mobile satellite system by the baseband processor 96 and input to the MOD 1.

The signal modulated by the modulator 95 (MOD 1) is supplied through the transmission IF circuit 94 (TX IF 1) to the INTFC 1.

The modulation and demodulation systems employed in the MOD 1 and the DEM 1 are those suitable for the mobile satellite system and the modulation and demodulation systems employed in the MOD 2 and the DEM 2 are those suitable for the mobile ground system.

The baseband processor 96 outputs a frequency control signal necessary for the mobile satellite system to the RX IF 1 and the TX IF 1 through a line 102. On the other hand, the baseband processor 96 outputs a frequency control signal necessary for the mobile ground system to the RX IF 2 and the TX IF 2 through a line 103.

The baseband processor 96 further functions to perform processing specific to the mobile satellite system and the mobile ground system, such as controlling a billing system, a zone switching system, etc.

As mentioned, the baseband processor 96 includes various complicated control functions. However, by utilizing a micro processor, the baseband processor 96 can be realized relatively easily.

An operation of this embodiment will be described with reference to FIG. 8. A signal from a satellite is received by the antenna 111 of the satellite system antenna/high frequency unit 71 shown in FIG. 9 and converted into the intermediate frequency (IF) signal having a predetermined intermediate frequency by the high frequency circuit 112 of the unit 71. This IF signal is supplied to the system converter portion 131 of the repeater 73 through the I/F 113 and the I/F 74. The IF signal is converted into an IF signal having intermediate frequency suitable for the ground system antenna/high frequency unit 72, the IF signal of the ground system antenna/high frequency unit 72 is supplied to the high frequency circuit 122 of the ground system antenna/high frequency unit 72 through the I/F 75 and the I/F 123.

The high frequency circuit 122 frequency-converts the input IF signal into a signal having a high frequency within a transmission frequency band suitable for the mobile ground communication system and transmits it through the antenna 121. This high frequency signal is received by the ground system antenna/high frequency unit 12 of the mobile terminal 7 shown in FIGS. 2 to 4.

As described with reference to FIG. 4, the mobile terminal 7 is set such that, when the interface 12a of the ground system antenna/high frequency unit 12 is connected to the interface 14 of the radio control unit 13, the demodulator 32 and the modulator 34 can perform the predetermined modulation and demodulation of the ground system according to the ground system demodulation control signal a and the modulation control signal b which are generated by the high frequency circuit 27 and the baseband processor 33 performs the signal processing for the ground system.

The transmission signal from the repeater 73 is received by the antenna 26 and converted into the predetermined intermediate frequency by the high frequency circuit 27. The IF signal thus obtained is supplied through the interfaces 14 and 28 and the receiving circuit 31 to the demodulator 32 in which it is normally demodulated. The demodulated signal c having frequency in the baseband and output from the demodulator 32 is supplied, together with the demodulation clock d, to the baseband processor 33 in which it is processed according to the corresponding protocol to obtain an audio signal or a display data. The auido signal is supplied to the telephone set 15 and the display data is displayed by the display 16.

On the other hand, for a signal transmission, a transmission data input through the key board 17 or an audio signal input from the telephone set 15 is processed by the baseband processor 33 according to a transmission protocol suitable for the ground system antenna/high frequency unit 12 to obtain the transmission signal e and the signal e is supplied, together with the transmission clock f, to the modulator 34 in which it is modulated according to the switched modulation system.

The modulated wave output from the modulator 34 is converted into an IF signal having predetermined intermediate frequency by the transmission IF circuit 35 and the IF signal is supplied to the high frequency circuit 27 through the interfaces 14 and 28 and transmitted from the antenna 26.

Therefore, according to the present invention, it is possible to communicate in the satellite system between the satellite system antenna/high frequency unit and the other and in the mobile ground system between the satellite system antenna/high frequency unit 71 and the mobile terminal 7 through the repeater 73 and the ground system antenna/high frequency unit 72 or 12. Thus, it is possible to communicate in the satellite system with the other even if the mobile terminal 7 shown in FIG. 8 is out of the line of sight of the satellite.

The ground system antenna/high frequency unit 72 or 12 may include a cellular communication antenna/high frequency unit which covers a wide area, a private radio antenna/high frequency unit which converts a relatively narrow area such as a factory area, a home radio antenna/high frequency unit covering a very narrow communication area such as the so-called cordless telephone or a home optical communication antenna/high frequency unit.

Therefore, in this embodiment, by connecting the satellite system antenna/high frequency unit 71 to one of the interfaces 74 and 75 and connecting the cellular communication antenna/high frequency unit to the other interface, it is possible to perform a relay between the satellite system and the cellular system. Further, by setting the relay device having the cellular communication antenna/high frequency unit connected to one of the interfaces 74 and 75 and the private radio system antenna/high frequency unit connected to the other interface in a location covered by the cellular system, it is possible to communicate between the private radio system and the cellular system even in an area which is covered by the private system radio wave but not covered by the cellular system.

The present invention is not limited to the described embodiments. For example, in order to accommodate to various mobile terminals, different radio frequencies may be used as communication means between the repeater 73 and the mobile satellite terminal 16. Further, the present invention can be applied to a radio communication utilizing infrared ray or light.

Further, by making the repeater 73 foldable or housing the repeater 73 within a casing, the portability of the mobile satellite terminal equipment is improved. The existing mobile communication system using the mobile terminal 7 including the antenna/high frequency unit and the radio control unit integrated therewith includes a navigation system such as GPS (Global Positioning System) which utilizes a satellite.

As described hereinbefore, in the mobile terminal of the present invention, the mobile ground system and the mobile satellite system can use the radio control unit commonly and it is possible to communicate with the other side through either one of the mobile ground communication system and the mobile satellite communication system by selectively connecting the interface of the antenna/high frequency unit of the selected mobile communication system to the interface of the radio control unit. Therefore, in use, the mobile terminal equipment of the present invention is composed of the radio control unit and the selected antenna/high frequency unit, which is compact, light-weight and low cost compared with the conventional equipment, and can communicate through either one of the mobile ground communication system and the mobile satellite communication system.

Further, since, when the mobile satellite or ground antenna/high frequency unit is connected to the radio control unit interface, the circuit portion of the control unit is automatically switched to the system suitable to the connected antenna/high frequency unit, there is no need of any switching operation and any circuit for switching the system, causing the operability to be improved and the terminal construction to be simpler.

Further, by performing a bi-directional signal transmission between the first and second antenna/high frequency units connected to the interfaces of the relay device of the present invention, the relay device can communicate between the mobile communication system in which signal transmission and receiving is possible by means of the first antenna/high frequency unit and the mobile communication system in which signal transmission and receiving is possible by means of the second antenna/high frequency unit. Therefore, it is possible to communicate with a mobile terminal in an over-the-horizon location and thus it is possible to perform a mobile communication through a satellite circuit even in countries in which the traffic condition of ground communication is undesirable or in an office room without moving the mobile terminal to a window of the office room.

Further, according to the present invention, since the two interfaces of the repeater are commonly used by the interfaces of the respective first and second antenna/high frequency units, it can relay a communication between various communication systems by selecting the kind of the first and second antenna/high frequency units. Further, since the relay according to the present invention can be made compact and light-weight, it can be easily transported together with the antenna/high frequency units and thus the over-the-horizon communication is facilitated.

What is claimed is:

1. A mobile satellite equipment comprising a relay device for relaying between a mobile satellite communication system and a mobile ground communication system, said relay device comprising:

a first antenna/high frequency unit including a first mobile communication system antenna and a high frequency circuit connected to said first mobile communication system antenna for converting a receiving signal into an intermediate frequency signal, outputting it to a first interface and converting an intermediate frequency signal input from said first interface into a high frequency signal, said first interface being provided externally of a casing of said first antenna/high frequency unit;

a second antenna/high frequency unit including a second mobile communication system antenna and a high frequency circuit connected to said second mobile communication system antenna and adapted to convert a receiving signal into an intermediate frequency signal and outputting it to a second interface and to convert an intermediate frequency signal input from said second interface into a high frequency signal, said second interface being provided externally of a casing of said second antenna/high frequency unit; and a repeater including a first radio control interface and a second radio control interface for performing a bi-directional signal transmission between said first radio control interface connected to said first interface of said first antenna/high frequency unit and a second radio control interface connected to said second interface of said second antenna/high frequency unit.

2. A mobile satellite equipment claimed in claim 1, wherein said first antenna/high frequency unit comprises a satellite system antenna/high frequency unit including a satellite system antenna for transmitting and receiving a radio signal with respect to a satellite and said high frequency circuit for converting the receiving signal into the intermediate frequency signal, outputting it to said first radio control interface and converting a transmission signal input from said repeater into a mobile satellite communication system high frequency signal, and said second antenna/high frequency unit comprises a ground system antenna/high frequency unit including a ground system antenna for transmitting and receiving a radio signal with respect to a mobile terminal and said high frequency circuit for converting the receiving signal into the intermediate frequency signal, outputting it to said second radio control interface and converting a signal input from said repeater into a mobile ground communication system high frequency signal.

\* \* \* \* \*